United States Patent [19]

Leighton et al.

[11] Patent Number: 4,915,845
[45] Date of Patent: Apr. 10, 1990

[54] INHIBITION METHOD

[75] Inventors: John C. Leighton, Flanders; Michael J. Sanders, Flemington, both of N.J.

[73] Assignee: National Starch and Chemical Corporation, Bridgewater, N.J.

[21] Appl. No.: 324,509

[22] Filed: Mar. 16, 1989

Related U.S. Application Data

[60] Division of Ser. No. 147,125, Jan. 21, 1988, Pat. No. 4,892,898, which is a continuation-in-part of Ser. No. 944,478, Dec. 19, 1986, abandoned.

[51] Int. Cl.$^4$ .............................................. C02F 1/00
[52] U.S. Cl. .................................... 210/701; 252/8.551
[58] Field of Search ...................... 210/701; 252/8.551, 252/8.552, 8.553, 8.554

[56] References Cited

U.S. PATENT DOCUMENTS

| | | | |
|---|---|---|---|
| 3,410,835 | 11/1968 | Mazzolini et al. | 526/287 |
| 3,426,104 | 2/1969 | Masson . | |
| 3,781,248 | 12/1973 | Sakai | 526/287 |
| 4,163,089 | 7/1979 | Palethorpe | 526/80 |
| 4,265,970 | 5/1981 | Bach | 428/364 |
| 4,293,613 | 10/1981 | Bach et al. | 428/364 |
| 4,294,884 | 10/1981 | Bach et al. | 428/364 |
| 4,595,736 | 6/1986 | Patel | 526/271 |

Primary Examiner—Christopher Henderson
Attorney, Agent, or Firm—Ellen T. Dec; Edwin M. Szala

[57] ABSTRACT

Water soluble polymers comprising at least one mole percent of a recurring monomer unit represented by the chemical structure

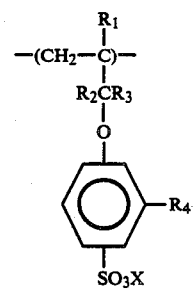

wherein $R_1$, $R_2$, $R_3$, and $R_4$ are independently hydrogen or $C_1$–$C_6$ alkyl; and X is hydrogen, an alkali or alkaline earth metal or ammonium are disclosed.

13 Claims, No Drawings

INHIBITION METHOD

This application is a division of application Ser. No. 147,125 filed Jan. 21, 1988 now U.S. Pat. No. 4,892,898, which is a continuation-in-part of application Ser. No. 944,478 filed Dec. 19, 1986 and now abandoned.

BACKGROUND OF THE INVENTION

This invention relates to novel water soluble polymers of allyloxybenzenesulfonate monomers, a process for their preparation, and to their use in aqueous systems containing particulate matter.

There are many aqueous industrial systems which require that various solid materials remain in a suspended or dispersed state. Typical aqueous systems include, for example, boiler water or steam generating systems, cooling water systems, gas scrubbing systems, pulp and paper mill systems, desalination systems, and downhole systems encountered during the production of gas, oil, and geothermal wells. Most water contains (either naturally or by contamination) ingredients which can cause accumulation, deposition, and fouling problems. Without the use of suitable water soluble polymers which act as dispersants and/or scale inhibitors in the water, undesirable inorganic mineral scale and/or sludge deposits will form in dynamic industrial systems as well as in static systems such as water storage tanks and the ballast tanks of ships and vessels. Such deposits have a deleterious effect on the economics and maintenance of such facilities resulting in poor water circulation and, in the case where the system requires heating, significant losses in heat transfer efficiency.

Typical deposits include iron oxides, calcium, magnesium and zinc deposits (e.g., carbonates, sulfates, silicates, oxylates, phosphates, etc.), silt, alumina, aluminum, clays, mud, etc.

Some factors which influence scale and sludge formation include the temperature, rate of heat transfer, divalent ion concentration, alkalinity, dissolved solids and the pH of the water in a particular system.

Many different synthetic water soluble polymers have been employed in a wide range of water treatment applications as dispersants for particulate matter and inhibitors of mineral scale formation and deposition. Polymers containing carboxylic acid and/or sulfonic acid functionality have been found to be particularly useful.

The water treatment industry is constantly looking for new processes and products which will provide more efficient operation of aqueous systems by maintaining water contaminates in a dispersed state under a wide range of process conditions. Dispersants which provide corrosion inhibition would also be considered very useful.

Water soluble polymers are also of importance in other systems including, for example, in drilling muds, cementiferous compositions, pigment dispersions, and mineral slurries.

In aqueous drilling muds, a dispersant's ability to deflocculate and disperse flocculated and agglomerated solids, especially in electrolyte-rich fluids, is highly desired. Conventionally used polyacrylates are known to be sensitive to divalent cations which may be introduced into a drilling fluid through electrolyte-releasing formations containing gypsum, lime and other salt deposits or by the water available to formulate the mud (e.g. sea water). There is still a need for new products which can provide rheological stability to polyelectrolyte containing drilling muds, and in particular to high solids muds (having densities greater than 15 pounds per gallon).

In cementiferous compositions, polymeric additives which improve the physical characteristics such as the flow and workability thereof are employed. The additives (often referred to as plasticizers) improve the flow characteristics of the compositions containing them so that they may be pumped or effectively poured to fill all the spaces in a mold or other structure. Such additives can be used to design cementiferous compositions with a reduced water content which still retain adequate flow properties.

Allyloxybenzenesulfonates have been copolymerized with acrylonitrile. The fibers produced from such copolymers have been found to have good basic and cationic dye receptivity. Methods for preparing the allyloxybenzenesulfonate monomers, the copolymerization of the monomers with acrylonitrile alone and with other olefinic monomers, and the fibers thereof are described in detail in the following references: Chemical Abstracts Volume 78 (1973), 78: 84025h; U.S. Pat. No. 3,410,835 (issued Nov. 21, 1968 to C. Mazzolini et al.); U.S. Pat. No. 3,426,104, (issued Feb. 4, 1969 to J. Masson); U.S. Pat. No. 4,163,089 (issued July 31, 1979 to G. Palethorpe); U.S. Pat. No. 4,265,970 (issued May 5, 1981 to H. Bach); and U.S. Pat. No. 4,293,613 and 4,294,884 (issued Oct. 6 and Oct. 13, 1981 respectively, to H. Bach et al.). None of the above references disclose or suggest the products of the present invention or their use in aqueous systems containing particulate matter.

SUMMARY OF THE INVENTION

According to the present invention, novel water soluble polymers of allyloxybenzenesulfonate monomers are provided.

The water soluble polymers comprise at least 1 mole percent of a recurring monomer unit represented by the chemical structure:

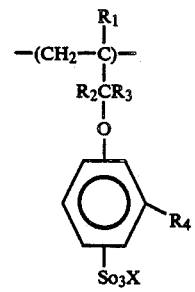

wherein $R_1$, $R_2$, $R_3$, and $R_4$ are independently hydrogen or $C_1$–$C_6$ alkyl; and X is hydrogen, an alkali or alkaline earth metal or ammonium.

A preferred embodiment of the present invention is directed to a water soluble polymer comprising recurring units of

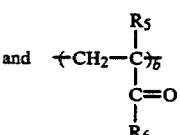

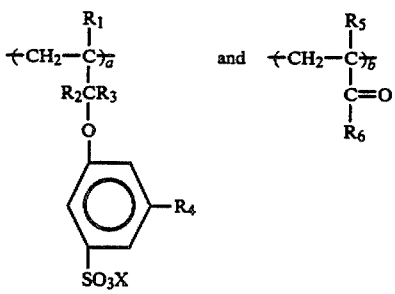

wherein the molar ratio of a to b is about 1:99 to 20:80;
$R_5$ is hydrogen or $C_1$-$C_6$ alkyl;
$R_6$ is $OX'$ or $NR_7R_8$;
$R_7$ and $R_8$ are independently hydrogen, $C_1$-$C_6$ alkyl, or an alkyloxyether or alcohol;
$X'$ is hydrogen, $C_1$-$C_6$ alkyl, an alkyloxyether or alcohol, or alkali or alkaline earth metal or ammonium; and
$R_1$, $R_2$, $R_3$, $R_4$, and X have the meanings described above.

The water soluble polymers described herein lend themselves useful in many applications where particulate material is required to remain in a suspended or dispersed state. The polymers are also useful as inhibitors of mineral scale formation and deposition in various water treatment applications.

DESCRIPTION OF THE PREFERRED EMBODIMENTS

The polymeric materials of the invention herein ae those produced from a monomer having the general formula:

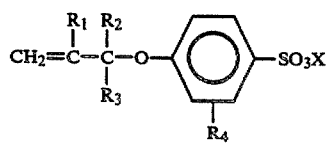

wherein $R_1$, $R_2$, $R_3$ and $R_4$ are independently hydrogen or $C_1$-$C_6$ alkyl; and X is hydrogen, an alkali or alkaline earth metal (preferably sodium or potassium), or ammonium.

The above monomers which are not new may be prepared by well-known processes illustrated, for example, by U.S. Pat. No. 3,426,104 (mentioned above).

The monomer found to be particularly useful herein is paramethallyloxybenzenesulfonic acid and salts thereof.

The polymeric materials encompass polymers (e.g., copolymers, terpolymers, etc.) of the above allyloxybenzenesulfonic acids or salts thereof with one or more copolymerizable comonomers. The weight average molecular weight of the polymers range widely, including polymers from about 1,000 to 5,000,000. For the applications described herein, the preferable molecular weight range is about 1,000 to 250,000.

The copolymerizable comonomers useful herein may be any vinyl polymerizable monomer, provided the overall solubility of the polymer in water is not altered. The monomer is preferably selected from the group consisting of acrylic acid, alkyl and hydroxyalkyl substituted acrylic acids, the alkali metal, alkaline earth metal, and ammonium salts thereof, and the esters thereof with $C_1$-$C_{18}$ alcohols; acrylamide and the lower alkyl substituted acrylamides (e.g., methacrylamide), the N-alkyl substituted and the N-alkanol substituted compounds thereof. Also useful herein are other water soluble monomers such as unsaturated vinylic acids, e.g., maleic acid or anhydride, itaconic acid, etc. and salts thereof; esters of vinylic acids, e.g. mono and di-methyl maleate, mono and di-ethyl itaconate, etc.; and (meth)allyl esters of saturated aliphatic monocarboxylic acids, such as (meth)allyl acetates, propionates and valerates. Minor amounts of crosslinking monomers such as diallyl maleate, alkylene bisacrylamide and triallyl cyanurate may also be employed herein.

The water soluble polymers comprise at least 1 mole percent of the allyloxybenzenesulfonic acid monomer, and preferably from about 2 to 15 mole percent. It should be understood that the specific sulfonic acid polymers of the present invention may be present in partial or complete salt form with an alkali or alkaline earth metal, ammonium or any other cation that yields a water soluble salt.

Water soluble polymers found to be of particular use herein are polymers of the allyloxybenzenesulfonic acid monomer and acrylic acid in either acid or water soluble salt form. The molar ratio of the sulfonic acid monomer to acrylic acid typically ranges from about 1:99 to 20:80, and preferably from about 2:98 to 15:85.

The polymers of the present invention may be prepared by any number of conventional means well known to those skilled in the art including, for instance, such techniques as bulk, emulsion, suspension, precipitation, or preferably solution polymerization.

The polymers are preferably prepared in an aqueous medium in the presence of any catalyst capable of liberating free radicals under the reaction conditions employed. Suitable catalysts include peroxides such as benzoyl peroxide, azo compounds such as azobisisobutyronitrile, and salts of peracids (e.g., sodium or potassium persulfate). Redox systems employing, for example, t-butyl hydroperoxide may also be employed. The polymerization is also preferably conducted under a blanket of nitrogen or other gas typically used for the exclusion of oxygen.

The molecular weight of the polymers may be controlled by various compounds used in the art including for example chain transfer agents such as mercaptans, ferric and cupric salts, bisulfites, and lower alcohols (preferably isopropanol). In a preferred embodiment, the polymerization methods involves reacting the monomers in the presence of a hypophosphorous acid, salt, or monoester thereof, with sodium hypophosphite being most preferred.

The polymerization will normally be conducted at a temperature of about 25° to 100° C. with a range of 65° to 85° C. being suitable for most thermal initiators. It should be understood that if a redox initiator is used, the polymerization can be carried out at lower temperatures.

While the polymers of the present invention have been described as the polymerization products of allyloxybenzenesulfonic acid with various comonomers, it will also be understood that similar products may be obtained by the sulfonation of a polymer containing phenyl ether groups. It is also conceivable that the polymers of this invention could be produced by the reaction of hydroxybenzene sulfonic acid with a polymer containing pendant chloromethyl groups (such as a polymer of allyl chloride).

In the following examples, which are for illustrative purposes only, all parts are by weight and all temperatures in degrees Celsius unless otherwise noted.

EXAMPLE 1

This example illustrates the preparation of water soluble polymers of an allyloxybenzenesulfonate prepared in the presence of a hypophosphite salt.

A two liter four-necked flask was equipped with a mechanical stirrer, thermometer, condenser, nitrogen purge, a means for heating the flask, and two addition funnels. The flask was charged with 300 ml. water, 5.3 g. of sodium hydrophosphite monohydrate and 46.3 g. of sodium p-methallyloxybenzenesulfonate (MBS). With a slow nitrogen purge, the contents were heated to and maintained at 77°–80° C. Thereafter, 253.7 g. acrylic acid (AA) and a solution of 7.5 g. sodium persulfate in 70 ml. water were added simultaneously over a period of 2 and 2.5 hours, respectively. The polymerization mixture was held at 85° C. for an additional two hours then cooled to room temperature. The polymer solution (measured as 45.2% dissolved solids) has a RVF Brookfield viscosity (Spindle #5, 20 rpm.) of 1730 cps. and a pH of 1.6. The polymer solution contained a residual unreacted acrylic acid monomer content of 1.55%. The 5:95 molar percent MBS:AA polymer (F) had a weight average molecular weight determined by gel permeation chromatography (Mw) of 139,000 and a number average molecular weight (Mn) of 27,000.

Using the above procedure, other polymers exemplified herein were prepared, in the specifics of which are set forth in Table I.

TABLE I

| Polymer | MBS:AA Molar Ratio | Mw | Mn |
|---|---|---|---|
| A | 2.7:97.3 | 11,400 | 4,480 |
| B | 2.7:97.3 | 11,900 | 4,670 |
| C | 2.7:97.3 | 21,000 | 6,800 |
| D | 2.7:97.3 | 26,400 | 8,130 |
| E | 5:95 | 12,800 | 5,050 |
| F | 5:95 | 139,000 | 27,000 |
| G | 10:90 | 12,200 | 5,140 |
| H | 10:90 | 79,000 | 19,900 |
| I | 15:85 | 10,900 | 4,580 |
| J | 15:85 | 51,400 | 13,300 |

EXAMPLE 2

This example illustrates the preparation of water soluble polymers of an allyloxybenzenesulfonate prepared by solution polymerization in the presence of isopropanol.

To an apparatus equipped as in Example 1 was added 135 ml. isopropanol, 165 g. water and 46.3 g. of MBS. The contents were heated to and maintained at 77°–80° C. Thereafter, 258 g. of AA and a solution of 10.0 g. of sodium persulfate in 70 ml. water were added simultaneously over a period of 5 hours. After maintaining the polymerization mixture at 77°–80° C. for an additional hour, the isopropanol was removed by distillation. The polymer solution was then cooled to room temperature. The polymer solution (measured as 44.6% dissolved solids) had a RVF Brookfield viscosity (Spindle #2, 20 rpm.) of 1300 cps. and a pH of 0.9. The polymer solution contained a residual unreacted acrylic acid monomer content of 1.17%. The 5:95 molar percent MBS:AA polymer had a Mw of 62,900 and a Mn of 11,500.

Using the above procedure, another 5:95 MBS:AA polymer exemplified herein was prepared. The polymer (Polymer K) had a Mw of 159,000 and a Mn of 26,800.

EXAMPLE 3

In order to illustrate the utility of the title polymers, a variety of tests were conducted which are described below:

A—Drilling Mud Deflocculant

The ability of a deflocculant to function to the presence of electrolyte contamination can be determined by observing the yield point and gel strength of a drilling mud. These values represent a quantitative measure of the attractive forces of the solids particles under low shear and static conditions, respectively. This attraction is a function of their intrinsic electrical charges as well as their concentration and the character of the liquid phase in which the particles are suspended. It is desirable to have a stabilized mud system with low rheological values, indicating less resistance to flow. Contamination of a bentonite drilling mud with electrolytes, especially divalent cations such as calcium and magnesium, will cause severe flocculation of clay particles resulting in an increase in yield point and gel strength.

Twenty-five pounds per 42-gallon barrel (ppb.) bentonite slurry samples consisting of 350 g. distilled water and 25 g. bentonite were prehydrated at room temperature for 16 hours. A total of 3% synthetic sea salt was added to each sample and the pH was adjusted and maintained at 9.0 with caustic. The slurry samples, having a final density of approximately 8.5 pounds per gallon (ppg.) contained a total of approximately 1,500 ppm free calcium and magnesium ions.

Thereafter, 1 g. of the polymers to be tested were added (in sodium salt form) to the slurries corresponding to a 1 ppb. treatment level. The treated slurries were statically aged in glass jars for 16 hours at 82° C., cooled to room temperature, then mixed for five minutes with a Hamilton Beach Multimixer before the flow properties were determined using a Fann Model 35A Viscometer. The following data was obtained:

TABLE II

| | 1500 ppm. $Ca^{++}$ and $Mg^{++}$ pH - 9.0 | | |
|---|---|---|---|
| Conditions of 8.5 ppg. slurry: | Dosage 1 ppb. polymer | | |
| Polymer Deflocculant | Apparent Viscosity (cps.) | Yield Point (lb./100 ft.$^2$) | Gel Strength (lb./100 ft.$^2$) |
| None (Control) | 20.5 | 31 | 22 |
| Polymer B (Mw = 12,000) | 9.5 | 9 | 8 |
| Polymer F (Mw = 139,000) | 7.5 | 3 | 1 |
| Polymer K (Mw = 159,000) | 7.5 | 3 | 0 |

The results show that the MBS copolymers evaluated provided improved rheological stability to the mud slurries in the presence of high concentrations of divalent cations.

By establishing the utility of the instant polymers as drilling mud additives, it would be apparent to the skilled art worker that the monomer constituents and molar concentrations thereof as well as the molecular weight of the useful polymers may vary. Factors which influence the quantity of the polymers needed for their intended purpose will also vary with circumstances depending on such factors as the weight and character of the drilling fluid treated, the formation strata type encountered, drilling depths, and contaminants encountered. Typical amounts of polymer employed range from about 0.1 to 25 ppb. of drilling mud, with the exact amount to be added being easily determined by routine tests known by those skilled in the art at the time the addition is made. Preferably amounts of 0.5 to 3 ppb. are employed. The instant polymers have also been observed to possess excellent high temperature stability. This property lends the polymers particularly useful in drilling operations conducted under conditions of high temperatures (e.g. 150° C. and above) and/or high pressures.

A second test was conducted employing a high solids synthetic sea water mud. In addition to polyvalent ion contamination, useful deflocculants should also be able to function in the presence of high concentrations of mud solids (including drilled solids and additives used to increase the density of a mud to control downhole pressure, e.g. barite).

Dense mud (16.5 ppg.) samples were formulated which consisted of 374 g. barite, 40 g. revdust (consisting primarily of calcium montmorillonite) to simulate drilled solids, 15 g. prehydrated bentonite, and 250 g. distilled water to which was added 3% simulated sea salt. The pH of the slurries was adjusted and maintained at 8.5-9.0 with caustic.

One gram of the polymer to be tested was added (in sodium salt form) to the mud slurries. The samples were aged and evaluated as described above. The following data was obtained:

TABLE III

| Conditions of 16.5 ppg. slurry: | 1500 ppm. $Ca^{++}$ and $Mg^{++}$ pH - 8.5-9.0 Dosage 1 ppb. polymer | | |
|---|---|---|---|
| Polymer Deflocculant | Apparent Viscosity (cps.) | Yield Point (lb./100 ft.$^2$) | Gel Strength (lb./100 ft.$^2$) |
| None (Control) | 87 | 108 | 93 |
| Polymer F (Mw = 139,000) | 34.5 | 17 | 8 |
| Sodium Polyacrylate (Mw = 123,000) comparative | 45 | 42 | 54 |
| 5:95 AMPS*:AA (Mw = 160,000) comparative | 40.5 | 29 | 37 |

*AMPS is 2-acrylamido-2-methylpropane sulfonic acid

The results show that the polymer of the present invention provided superior rheological stability to a high solids sea water mud system in comparison to other polymeric dispersants of similar molecular weight.

While the instant water soluble polymers will have utility as drilling fluid additives over a wide molecular weight range (e.g. Mw=1,000 to 1,000,000), it has been determined that the polymers having weight average molecular weights of at least 100,000 to about 500,000 are particularly useful in dense mud systems as seen above.

The ability of the polymers to provide rheological stability to a drilling fluid having been shown, various conventional additives used in conjunction with clays, weighing materials and the instant polymers are also contemplated herein. For example, caustic, lime, starch and cellulose derivatives, quebracho, lignite, lignosulfonate and other conventional additives may be added to the drilling composition.

B—Dispersant of Suspended Particulate Matter

It is generally believed that if a polymer is successful in dispersing iron oxide, it will satisfactorily dispers over difficult to disperse particles.

The data which follows was obtained by measuring the turbidity of iron oxide suspensions prepared under a standard set of conditions. The turbidity reading of a sample, measured in Nephelo Turbidity Units (NTU) will be greater with improved suspension of the particulate matter.

Suspensions containing 500 pp. $Fe_2O_3$ were prepared by adding 250 mg. of 0.3 u acicular iron oxide (specific gravity of 4.03) to 500 ml. of deionized water in a 1 liter beaker. The water contained 200 ppm $Ca^{++}$ as calcium carbonate which was buffered to maintain a pH of 8. The suspensions were stirred at approximately 150 rpm. for 3 minutes. Thereafter 5-20 ppm of the polymers to be tested were added to the suspensions and stirring continued for 30 minutes at 100 rpm. and then for 5 minutes at 40 rpm. The suspensions were then covered and allowed to stand for 17 hours. Turbidity measurements were made by analyzing samples taken from the suspensions at a level of about 3 cm. below the surface using a Hach 2100 Turbidimeter. Commercial grade polymers were also concurrently evaluated for comparative purposes. The following data was obtained:

TABLE IV

| Conditions of the aqueous suspension: | 200 ppm $Ca^{++}$ 500 ppm $Fe_2O_3$ pH - 8 | |
|---|---|---|
| Polymer | Dosage (ppm.) | Turbidity after 17 hours (NTU) |
| None-Control | — | 50 |
| Polymer G | 5 | 160 |
| 10:90 MBS:AA | 10 | 230 |
| (Mw = 12,200) | 20 | 330 |
| Polymer I | 5 | 170 |
| 15:85 MBS:AA | 10 | 255 |
| (Mw = 10,900) | 20 | 350 |
| Commercial Phosphino- | 5 | 105 |
| carboxylic acid$^a$ | 10 | 180 |
| (Mw <10,000) | 20 | 300 |
| Commercial AMPS:AA | 5 | 130 |
| Copolymer | 10 | 140 |
| (Mw 7,000) | 20 | 160 | a - Comparative polymer Belclene 400 obtained from Ciba Geigy
b - Comparative polymer QR-1086 obtained from Rohm and Haas The results show that the polymers of the present invention are effective in suspending ion oxide particles. Moreover, the polymers were more effective than commercial polymers general used for this purpose.

The performance exhibited under the above stringent test conditions by the instant polymers establishes their use as dispersants for insoluble particulate matter in aqueous systems. Such particulate matter would include, for example, the insoluble salts of calcium, magnesium, barium and strontium (e.g., carbonates, sulfates, oxalates, silicates, and phosphates); silt; alumina; and clays (e.g., kaolin, talc, silica, mica), and pigments (e.g. titanium dioxide and zinc oxide). The aqueous systems contemplated which contain one or more of the above particles would include, for example, dynamic and static industrial water systems, and pigment dispersions.

The amount of polymeric dispersant necessary to maintain the particulate matter in dispersion will vary depending on such factors as, for example, the concentration of particulate matter present in the system, amount of hardness ion present, and the pH.

In typical industrial water systems (both static and dynamic) the polymers will be effective when employed at about 0.1 to 500 parts per million parts of the aqueous system, and preferably from about 2.5 to 100 parts per million parts of the system.

C—Calcium Phosphate Scale Inhibition

Commonly found in boiler and cooling water systems, calcium phosphate is difficult to disperse, especially in the presence of soluble iron ion.

The test procedure conducted in evaluating the polymers are scale inhibitors utilized the following solutions containing calcium ion and ortho-phosphate ion:

I—36.76 g. $CaCl_2 \cdot 2H_2O$ dissolved in 1 l. distilled water

II—0.4482 g. $Na_2HPO_4$ dissolved in 1 l. distilled water

A stock solution was prepared by adding 20 ml. of Solution I to 1800 ml. distilled water in a 2 l. volumetric flask followed by 2 drops of concentrated HCl. Thereafter 40 ml. of Solution II was added and the volume was brought to 2 l. with distilled water. A 100 ml. aliquot of the solution was added to a 4 oz. glass bottle to which was added the desired polymer treatment. The pH was adjusted to 8.5 with 0.1N NaOH. The sample was placed in a 70° C. water bath and allowed to equilibrate for 17 hours. The sample was removed from the water bath and filtered immediately through a 0.2 u filter paper into a 250 ml. volumetric flask. After the filtrate was allowed to cool to room temperature, a 5 ml. aliquot was diluted to 10 ml. with distilled water in 25 ml. volumetric flask. Five (5) ml. of colormetric reagent was added. The reagent preparation comprised dissolving 10 g. of ascorbic acid into 100 ml. of equal volumes of 2.5% ammonium molybdate and 1% bismuth subcarbonate. Thereafter the filtrate and reagent mixture was diluted to 25 ml. and allowed to stand for 5 minutes for color development.

The optical density of the sample was measured using a Bausch and Lomb Spectronic 20 photometer (660 nm) using an infrared phototube and a red filter.

Using a current calibration curve plotting absorbance vs. ppm. $PO_4^{-3}$, the concentration of $PO_4^{-3}$ of the sample was measured. In order to calculate the percent phosphate inhibition, the following formula was used:

$$\% \text{ Inhibition} = \frac{\text{ppm. } PO_4^{-3} \text{ (treated)} - \text{ppm. } PO_4^{-3} \text{ (blank)}}{6 \text{ ppm. } PO_4^{-3} \text{ (stock)} - \text{ppm. } PO_4^{-3} \text{ (blank)}}$$

In an additional series of tests, the procedure described above was repeated but the aqueous systems were modified so as to additionally contain 2 ppm. soluble iron.

The following data was obtained:

TABLE V

| Polymer | system: Conditions of the aqueous system: Dosage (ppm.) | 250 ppm. $Ca^{++}$ 6 ppm. $PO_4^{-3}$ pH - 8.5 0-2 ppm $Fe^{++}$ $Fe^{++}$ion present (ppm.) | % $PO_4^{-3}$ Inhibition |
|---|---|---|---|
| Polymer G | 5 | 0 | 83.3 |
| | 5 | 2 | 70.0 |
| | 10 | 0 | 99.4 |
| | 10 | 2 | 88.7 |
| Commercial AMPS:AA | 5 | 0 | 85.1 |
| Copolymer[a] | 10 | 0 | 98.4 |

TABLE V-continued

| Polymer | system: Conditions of the aqueous system: Dosage (ppm.) | 250 ppm. $Ca^{++}$ 6 ppm. $PO_4^{-3}$ pH - 8.5 0-2 ppm $Fe^{++}$ $Fe^{++}$ion present (ppm.) | % $PO_4^{-3}$ Inhibition |
|---|---|---|---|
| | 10 | 2 | 84.9 | a - Comparative polymer QR-1086 obtained from Rohm and Haas

The results show that the polymer of the present invention was effective under the stringent testing conditions in inhibiting calcium phosphate precipitation with and without the presence of ferric ion.

Based on the above data, comparable results are expected in the inhibition of the precipitation of other calcium scale-forming salts as well as the salts of magnesium, barium and strontium with such anions as sulfate, carbonate, hydroxide, phosphate, oxylate and silicate. Such scale forming ions are found in many industrial aqueous systems including, for example, steam generating systems, cooling water systems, gas scrubbing systems, pulp and paper mill systems, as well as, and in disalination systems. Static systems including water storage tanks would also benefit by the scale-inhibiting properties of the present polymers. Treatment levels of 0.1 to 500 parts per million parts of the aqueous system are typically employed in the above aqueous systems, with 2.5 to 100 parts per million parts being preferred. As scale inhibitors, the preferred weight average molecular weight of the present polymers is about 1,000 to 25,000.

D—Dispersant for Concentrated Aqueous Particulate Slurry

Clays (e.g., kaolin and attapulgite) and pigments (e.g., calcium carbonate and titanium dioxide) are employed in a variety of systems including, for example as fillers in plastic, rubbers, paper, fertilizers, herbicides, pesticides and animal feed; and as pigments in paints, rubbers, and paper coatings. For many applications, the particulate matter is shipped, stored and/or applied as a concentrated aqueous slurry containing from about 25–85% solids by weight, most typically 50–80% solids. It is therefore a necessity that the slurry viscosity be as low as possible in order to afford ease of handling during pumping, admixing and application operations. A useful dispersant should be capable of providing stable low slurry viscosities preferably over a wide usage range (e.g. minor fluctuations in dispersant concentration will not greatly affect slurry viscosity).

Three MBS copolymers described in Table I were tested under the following conditions as dispersants for calcium carbonate at 65% slurry solids by weight:

Into a 300 ml. stainless steel cup is added the amount of aqueous dispersant polymer solution to be tested and distilled water to bring the solution to 70 mls. To the solution is added 130 g. of Supermite grade calcium carbonate (obtained from Cyprus-Thompson, Weinman Co. of Cartersville, Ga.) with slow mixing to form a slurry. The 65% particulate solids slurry is mixed for 2 minutes at 3000±100 rpm. on a dispersator obtained from Premier Mill Corp. of Temple, Pa. The slurry is thereafter poured into a 100 ml. glass jar, covered, and then statically aged for a total of 48 hours in a forced draft oven at 49° C. After aging, the sample is shaken vigorously twice before a viscosity measurement is taken, the viscometer (a Brookfield RVF Viscometer employing Spindle #3 at 50 rpm.) being run in the slurry for 3 minutes prior to taking the reading.

The results obtained using 0.2–0.6% polymer dispersant based on CaCO$_3$ solids may be found in Table VI.

TABLE VI

| Polymer Dispersant[a] | Brookfield Viscosity of CaCO$_3$ Slurry with Dispersant[b] (cps.) | | | | |
|---|---|---|---|---|---|
| | 0.2% | 0.3% | 0.4% | 0.5% | 0.6% |
| F | 1210 | 316 | 230 | 250 | 286 |
| H | 1546 | 440 | 330 | 284 | 300 |
| J | NR | 1080 | 426 | 320 | 274 | a - all polymers were evaluated in sodium salt form
b - percent dispersant is based on CaCO$_3$ solids
NR - not recorded The results show the effectiveness of the instant polymers as dispersants for high solids particulate slurries.

Similar results are expected with concentrated slurries of other inorganic pigments and clays including those mentioned above. The dispersed slurries will typically employ the polymers in amounts ranging from about 0.05 to 5% based on the weight of the particulate matter to be dispersed.

While the polymers herein may be employed alone, it is also contemplated that the polymers may be employed in conjunction with other conventional additives to achieve additional benefits including, for example, biodispersants, defoamers and inorganic polyphosphates.

E—Cement Plasticizer Additive

To determine the merit of the instant polymers as plasticizers of cementiferous compositions, the following cement mix was employed:

| |
|---|
| 1350 g. ASTM C-190 grade sand |
| 450 g. Portland Type I cement |
| 225 g. Water |
| Aggregate/cement = 3 |
| Water/cement = 0.5 |

Five solution polymers (all in sodium salt form) described in Table I were evaluated at a concentration of 0.9% solids based on cement while maintaining a constant 0.5 water/cement ratio. The cement mortar samples were prepared by placing the water, polymeric additive and 0.3% tributyl phosphate antifoaming agent (based on polymer solids) in the bowl of a Hobart N-50 mixer. The cement was added over 30 seconds with slow mixing. The mixer was stopped, then set on low speed while the sand was added over 30 seconds. The mixing speed was increased and held at medium for one minute. Workability of the cement mortar was measured using a flow table described in ASTM C932-80. The cement mortar is added to the cone in two layers tamping after each addition. The top is squared off to remove excess. The cone is lifted slowly to leave the cement mortar on the surface of the flow table. The handle is turned 15 times at a steady rate after which the amount that the cement mortar has flowed is determined by measuring the diameter of the mortar in two directions 90° to each other. The average of these is the flow. An increase in flow would indicate the ability of the polymer to plasticize the cement. The results are shown in Table VII.

TABLE VII

| Polymer Additive | Polymer Dose % by wt. cement | Flow (cm.) |
|---|---|---|
| None (Control) | 0 | 16.5 |
| A | 0.9 | 19.4 |
| E | 0.9 | 19 |
| G | 0.9 | 19 |
| C | 0.9 | 18.5 |
| D | 0.9 | 18.3 |

The results show the instant polymers to provide an increase in flow to the cement compositions.

The necessary amount of the present polymers to provide acceptable flow may be readily determined by one skilled in the art. Typically the cement composition will comprise cement, water, coarse and fine aggregate and about 0.01 to 2.5% of the polymeric plasticizer additive, based on the weight of the cement.

The preferred embodiments of the present invention having been described above, various modifications and improvements thereof will now become readily apparent to those skilled in the art. Accordingly, the spirit and scope of the present invention is defined not by the foregoing disclosure, but only by the appended claims.

We claim:

1. A method for dispersing inorganic particulate matter in an aqueous system comprising adding an effective particulate dispersant amount of a water soluble polymer consisting essentially of 1 to 20 mole percent of a recurring monomer unit (A) represented by the chemical structure:

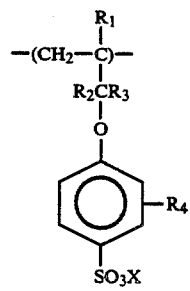

wherein
$R_1$, $R_2$, $R_3$, and $R_4$ are independently hydrogen or $C_1$–$C_6$ alkyl; and
X is hydrogen, an alkali or alkaline earth metal or ammonium and 80 to 99 mole percent of a monomer unit (B) represented by the structure

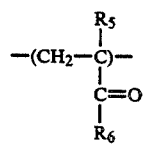

wherein
$R_5$ is hydrogen or $C_1$–$C_6$ alkyl;
$R_6$ is OX' or NR$_7$R$_8$;
$R_7$ and $R_8$ are independently hydrogen, $C_1$–$C_6$ alkyl, or hydroxyalkyl; and
X' is hydrogen, $C_1$–$C_6$ alkyl, hydroxyalkyl, an alkali or alkaline earth metal or ammonium.

2. The method of claim 1, wherein the monomer unit (A) is represented by the structure:

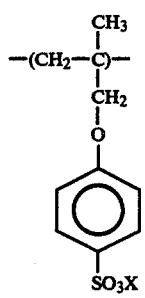

3. An aqueous drilling mud wherein the particulate matter is dispersed according to the method of claim 1 employing from about 0.1 to 25 pounds per barrel of the water soluble polymer.

4. The aqueous drilling mud of claim 3, having a density of at least 15 pounds per gallon.

5. The aqueous drilling mud of claim 3, wherein the polymer has a weight average molecular weight of about 100,000 to 500,000.

6. The aqueous drilling mud of claim 3, wherein the particulate matter is dispersed in sea water.

7. A high solids particulate slurry having 25 to 85% by weight of solids wherein the particulate matter is dispersed according to the method of claim 2.

8. The high solids slurry of claim 7, wherein the particulate matter is selected from the group consisting of clays and pigments.

9. The high solids slurry of claim 8, wherein the particulate matter is selected from the group consisting of calcium carbonate, titanium dioxide, attapulgite and kaolin.

10. A method for inhibiting the formation and deposition of mineral scale in an aqueous system comprising introducing into the aqueous system an effective amount for the purpose of a water soluble polymer consisting essentially of 1-20 mole percent of a recurring monomer unit (A) represented by the chemical structure:

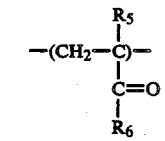

wherein
$R_1$, $R_2$, $R_3$, and $R_4$ are independently hydrogen or $C_1$-$C_6$ alkyl; and
X is hydrogen, an alkali or alkaline earth metal or ammonium, and 80 to 99 mole percent of a monomer unit (B) represented by the structure $$-(CH_2-\underset{\underset{R_6}{C=O}}{\overset{R_5}{C}})-$$

wherein
$R_5$ is hydrogen or $C_1$-$C_6$ alkyl;
$R_6$ is OX' or $NR_7R_8$;
$R_7$ and $R_8$ are independently hydrogen, $C_1$-$C_6$ alkyl, or hydroxyalkyl; and
X' is hydrogen, $C_1$-$C_6$ alkyl, an alkyloxyether or alcohol, an alkali or alkaline earth metal or ammonium.

11. The method of claim 10, wherein the aqueous system is a steam generating system, a cooling water system, a gas scrubbing system, a paper mill system, a desalination system, or a static water storage system.

12. The method of claim 10, wherein the monomer unit (A) is represented by the structure

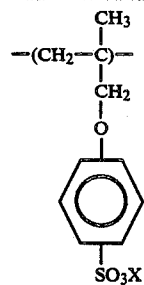

13. The method of claim 10, wherein the polymer has a weight average molecular weight of about 1,000 to 25,000 and is present in an amount of from about 0.1 to 500 parts per million parts of the aqueous system.

* * * * *